SCANNER SPEED CONDITIONING UNIT

Filed Aug. 19, 1968 2 Sheets-Sheet 1

INVENTOR.
ERIC A. von HIPPEL
BY
Blair Cesari & St. Onge
ATTORNEYS

INVENTOR.
ERIC A. von HIPPEL
BY
Blair Cesari & St. Onge
ATTORNEYS

United States Patent Office 3,533,249

Patented Oct. 13, 1970

3,533,249

SCANNER SPEED CONDITIONING UNIT

Eric A. von Hippel, Weston, Mass., assignor to Graphic Sciences, Inc., Danbury, Conn.

Filed Aug. 19, 1968, Ser. No. 753,634

Int. Cl. F16d 3/12

U.S. Cl. 64—27 13 Claims

ABSTRACT OF THE DISCLOSURE

A drive system for a rotary drum facsimile transmitter and receiver has a resilient energy-absorbing element connecting a drive source to the drum to rotate the drum during the reproduction process. The energy-absorbing element is in the form of a plug of rubber or elastomeric material attached to the hub of a driving gear and having a coupling blade embedded in it for engagement with the drum shaft. In addition to cushioning shocks which may be generated during the reproduction process and damping their transmission between the drum and the drive, the resilient element provides tolerance to possible misalignment between the drum shaft and the driving gear and allows rapid connection and disconnection of the drum and driving system.

BACKGROUND OF THE INVENTION

Field of invention

The invention relates to a rotary drum facsimile system and, more particularly, to a novel drive system for the rotary drum facsimile system.

Prior art

Facsimile systems are utilized to reproduce a document at a remote location. Such systems generally comprise a transmitter at one location, a receiver at another location, reading and reproducing heads associated with the respective transmitter and receiver, and the means for moving the heads relative to a document in order to read the document at one location and reproduce it at the other. In some cases the reading and reproducing heads may be associated with the same facsimile machine to enable it to operate in either the reading mode or the reproducing mode, as desired.

One convenient system, which will be described in more detail hereinafter, uses a rotary drum to mount the document. Relative motion between the reading or reproducing head and the document is obtained by simultaneously rotating the drum and moving the head along a straight line adjacent the drum and parallel to its axis in order to generate a helical scanning pattern of the head relative to the document on the drum.

In order to ensure an accurate reproduction, it is necessary to drive the drum uniformly and smoothly at a controlled rate. In present driving systems using a fully geared or "hard" coupling between the device and the drum, irregularities which may appear in the driving motor or the driving gear train interposed between the motor and the drum apply shocks or sudden transients to the drum and cause it to drive at an uneven rate, at least momentarily. This uneven driving constitutes "jitter" in the documentary reproduction and may eventually make it illegible. These shocks also cause excessive wear on the gear train and motor since the relatively large inertia of the drum gives rise to reaction forces on the gear train and motor equal and opposite to the shock forces applied to the drum. Thus, elimination of these shock forces, or at least a reduction in their intensity, not only improves the quality of the reproduction but also prolongs the life of the driving system.

During the intervals when the drum is not being rotated for reproduction purposes, it is necessary to disconnect the drive system from the drum. In present facsimile systems this is usually done by mean sof a clutch interposed between the drum and the drive system. Such clutches, whether of the mechanical, magnetic or other type, are relatively expensive and subject to continued wear. Further, their sudden engagement imposes shocks on the system similar to those generated by motor and drive system irregularities. The elimination of such clutches therefore significantly improves the useful life of the system and decreases its cost.

At the end of each reproduction cycle, it is generally desirable to bring the drum to a full stop in a relatively short time interval in order to conserve transmission facilities. Further, in facsimile systems providing semi-automatic document loading, it is necessary to stop the drum at the same angular location after each reproduction cycle to ensure that the loading and unloading apparatus is properly aligned with the document on the drum. This is accomplished most easily by frictionally engaging or "grabbing" the drum immediately at the end of each reproduction cycle to restrain further motion of the drum. In systems in which clutches are used, the clutch is disengaged immediately before this point to prevent coupling back to the driving motor any shock force which could possibly damage the motor, the gear train, or both. If clutches are to be eliminated, however, it is necessary to provide an alternative means for minimizing this shock.

In order to provide rapid access to all the components of the facsimile system for repair or replacement of the parts, it is necessary that the drive system be disconnected readily from the drum and as quickly reconnected. With many of the prior facsimile systems, this is not easily done without time-consuming disassembly or assembly procedures or special tools or skills. Further, critical alignment tolerances must often be maintained in the linkage between the the drive system and the drum, thus further increasing the cost and complexity of the system.

SUMMARY OF THE INVENTION

Objects

Accordingly, it is an object of the invention to provide an improved rotary drum facsimile system.

Further, it is an object of the invention to provide an improved drive system for a rotary drum facsimile system.

Another object of the invention is to provide a rotary drum drive system which eliminates shock-force coupling between the drum and the drive system.

Still a further object of the invention is to provide an improved rotary drum drive system having both shock-absorbing and energy-dissipating capabilities.

Yet another object of the invention is to provide an improved drive system for a rotary drum facsimile system which requires no driving clutch.

Another object of the invention is to provide an improved rotary drive system which is readily disconnected from, and connected to, a drum it is driving.

Still another object of the invention is to provide an improved rotary drum drive system which is quickly aligned with the drum it is to drive and which has increased tolerance to alignment inaccuracies.

Other and further objects of the invention will appear more clearly hereinafter.

Brief description of the invention

The invention comprises a rotary drive system having a flexible, resilient, energy-absorbing element connected between a source of motive power and a rotary drum it is to drive. The drive system is especially adapted for use in conjunction with the facsimile system disclosed in copending patent application Ser. No. 747,001, filed July 23, 1968 by Eric A. von Hippel and assigned to the asignee of the present invention. The energy-absorbing element, which may be formed from rubber, from an elastomer, or from other flexible, resilient, energy-absorbing materials, transmits, without diminution, steady forces applied between the driving source and the drum, but absorbs shock forces suddenly applied between the two; it subsequently releases the stored energy at a controlled rate to smooth out the driving transients.

In addition to storing energy, the resilient element also dissipates energy in an amount proportional to its damping constant $\alpha$. This constant relates the shock applied to the drive system to the time required to dissipate a given percentage of the shock force. The action of the resilient element in analogous to that of an electric filter which smooths the variations in a signal applied to it to provide an output of more nearly constant magnitude.

In addition to isolating the drum from shocks caused by driving motor or driving gear irregularities, the resilient element isolates the driving motor and gear train from shocks caused by sudden stopping of the drum so that the drum may be stopped almost instantaneously without danger of severe damage to the motor or gear train.

A blade extending from the flexible, resilient element and partly embedded in it provides the drive coupling between the resilient element and the drum. This blade is of wedge-shaped or "screwdriver" form; it fits into a slo on the shaft of the drum to impart rotational motion to the drum. Because of the flexibility of the resilient element, it is not necessary that the blade and the drum shaft be precisely aligned with each other when the two are to be connected together. Instead, they may be angularly or laterally misaligned and yet be connected together readily by manually moving the blade in the resilient element sufficiently to obtain the desired alignment. This feature is highly advantageous in constructing low-cost facsimile systems since it minimizes the need for holding close tolerances on components during the manufacturing process.

The invention accordingly comprises the features of construction, combination of elements, and arrangements of parts which will be exemplified in the construction hereinafter set forth, and the scope of the invention will be indicated in the claims.

DETAILED DESCRIPTION OF THE INVENTION

For a fuller understanding of the nature and objects of the invention, reference should be had to the following detailed description taken in connection with the accompanying drawings, in which.

Figure 1:
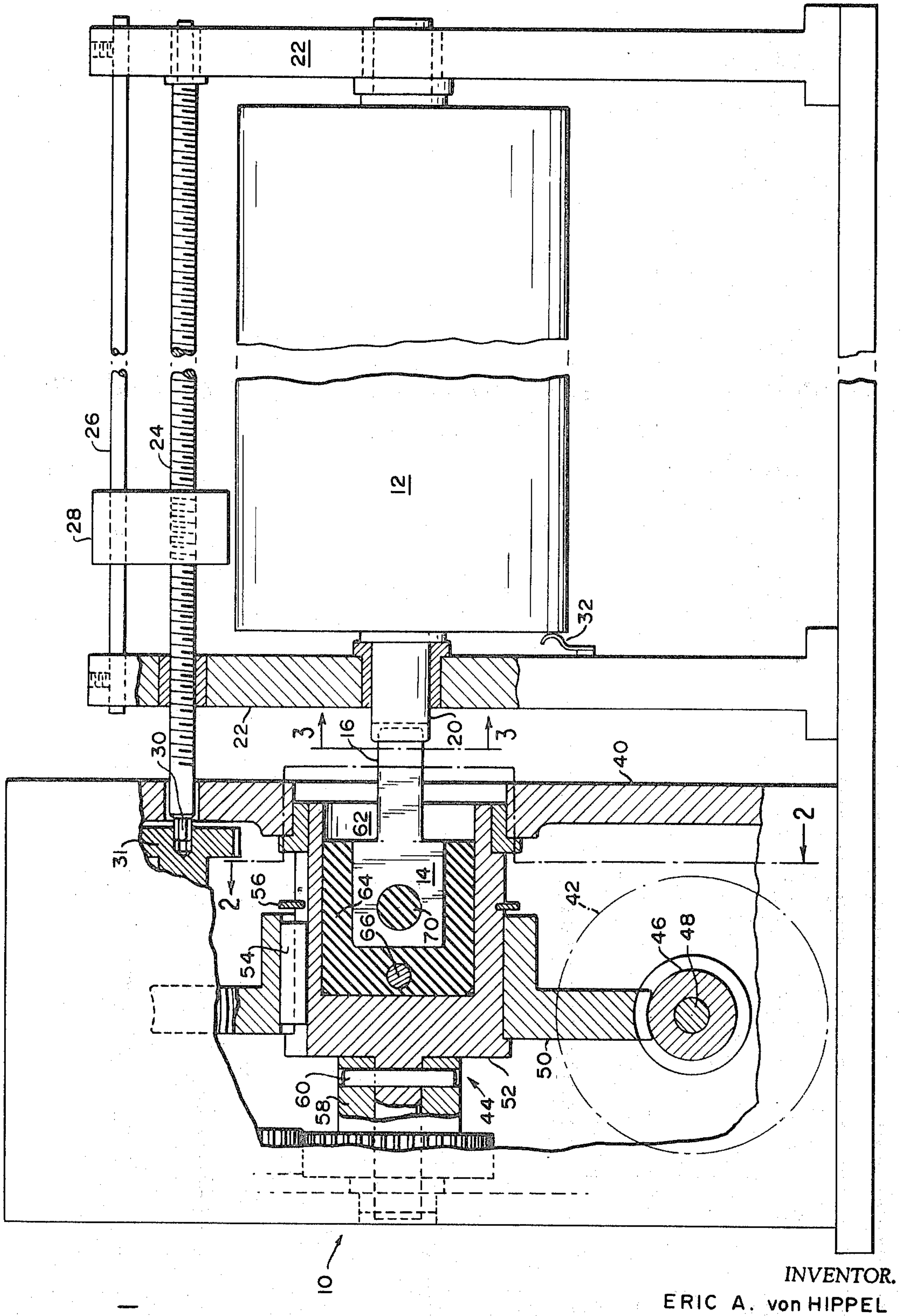
FIG. 1 is a front elevational view, with portions broken away, of a preferred embodiment of the invention.

In FIG. 1, there is shown a drive system 10 connected to a rotary drum 12 via a coupling plate 14 having a blade portion 16 which fits into a slot 18 (FIG. 4) in the shaft 20 of the drum. The actual connection is seen in greater detail in FIGS. 2–4. End supports 22 support the drum 12 for rotation and also rotatably mount a lead screw 24 and a guide rod 26. A reading and reproducing head 28 is slidably carried on rod 26 and it is driven by the lead screw 24 in a direction parallel to the drum shaft. The lead screw 24 has a reduced hexagonal end 30 which slides into a corresponding hexagonal recess in the hub of a gear 31 in the drive system 10.

A drum tensioning or "drag" element, illustratively shown as a spring-loaded arm 32, is also attached to frame 22 and presses against drum 12; the arm is adjustable to provide a selected restraining force opposing the drum motion for reasons to be described hereinafter.

Figures 2, 3, 4:
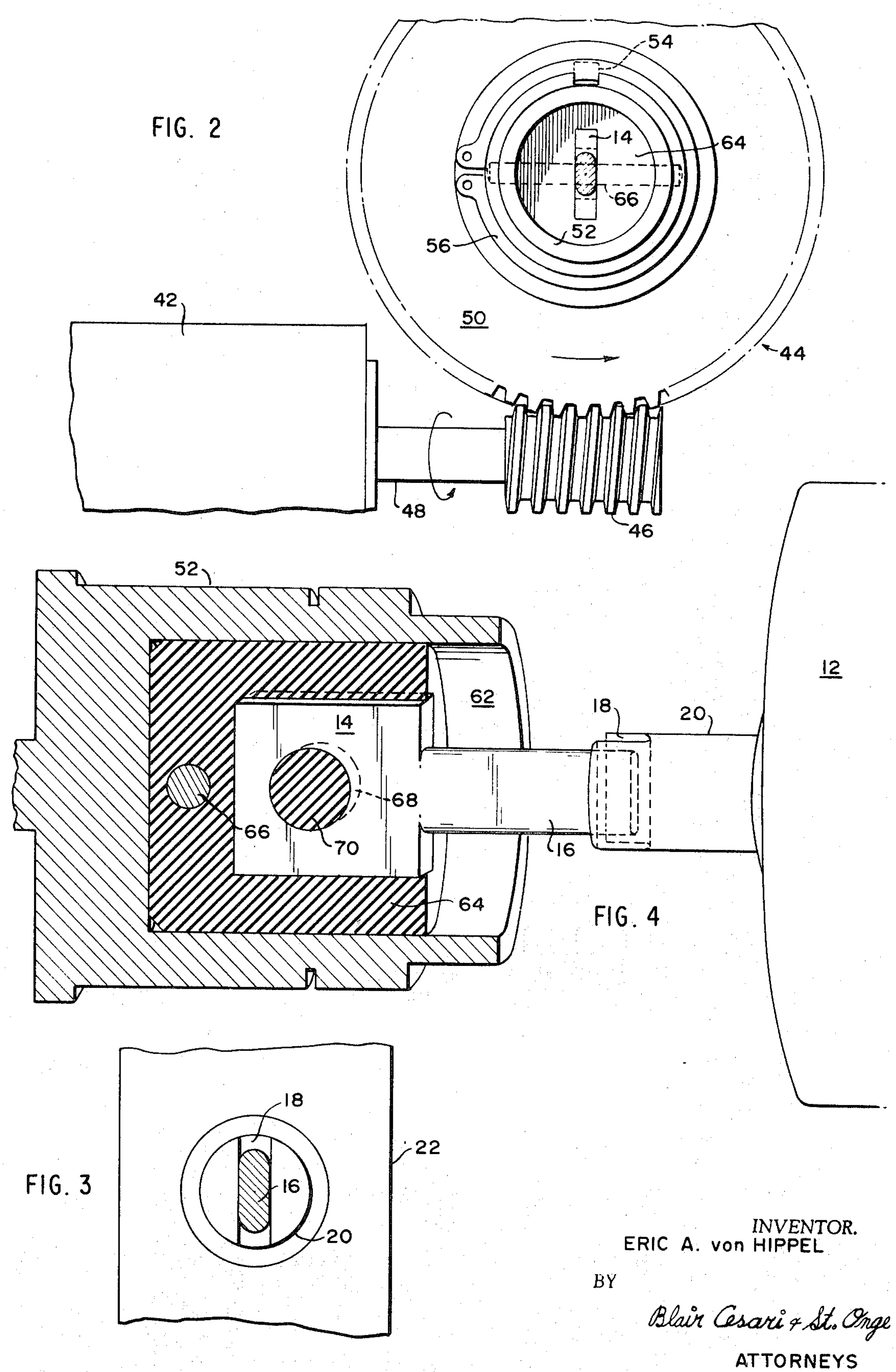
FIG. 2 is a side sectional view taken along the line 2—2 of FIG. 1.
FIG. 3 is a side sectional view taken along the line 3—3 of FIG. 1.
FIG. 4 is a view in perspective of a portion of FIG. 1.

Referring to FIGS. 1 and 2 and considering the drive system 10 in more detail, it has a housing 40 enclosing a motor 42. Motor 42 drives a primary drive gear, indicated generally at 44, through a worm gear 46 connected to the motor shaft 48. The primary drive gear 44 has a gear portion 50 and a hub 52 to which the gear portion is attached by means of a key 54. The key is maintained between the gear portion 50 and the hub 52 by means of a retainer ring 56. The hub 52 is also connected to other gears in the driving system by means of a shaft 58 attached to hub 52 by a pin 60.

As best seen in FIG. 4, hub 52 has a central cylindrical recess 62 which is nearly completely filled by a plug 64 of resilient material. This plug is held within the central recess by a pin 66 which extends through the plug and into the walls of hub 52. An aperture 68 formed in the plate 14 has a portion 70 of the plug extending through it to assist in firmly holding the coupling plate within the plug 64.

Referring again to FIG. 1, motor 42 rotates main driving gear 44 by means of worm gear 46. The gear 44 in turn is rotatably coupled to drum 12 by means of blade 16 of plate 14 which is embedded in plug 64; the blade 16 drives drum 12 in synchronism with motor 42. When motor 42 is first started, the inertia of the drum 12 and the frictional forces created by spring 34 and the bearing surfaces of the drum cause the motion of plate 14 to lag somewhat behind that of gear 44. In consequence, plug 64 rotates several degrees before plate 14 begins to rotate. This causes distortion of the shape of the plug with consequent storage of energy within it.

As the drum gains rotational speed and its inertial reactive force on plug 64 decreases, the plug 64 returns to its undistorted shape and the stored energy is transferred to drum 12 via the coupling plate 14 and thus appears as an additional driving force over the interval in which the energy transfer takes place. Since, however, this energy transfer takes place over a longer time span than that of the force giving rise to the distortion, the magnitude of the additional driving force is greatly diminished as compared to the magnitude of the shock force from which it originated; plug 64 thus effectively "smooths" the suddenly applied driving force. This is analogous to the smoothing which occurs when a sharp transient is applied to an electrical LC filter so that the energy-absorbing element may be said to "filter" the transients in the drive system. In addition to preventing "jitter" in the reproduction, this protects the drive system components and extends their useful life.

When drum 12 is brought up to speed, its inertial reactive force on plug 64 decreases to zero as noted previously. However, the friction forces generated by spring 34 and the bushings in which the drum shaft is mounted exert a residual restraining force on blade 16 to cause an angular lag between the rotational position of plug 64 which persists as long as the drum is rotating. This rotational lag corresponds to storage of a given amount of energy within plug 64 and increases the resistance of the plug to further deformation, thereby increasing its effective stiffness. Since this phase lag is proportional, in part, to the pressure exerted on the drum by spring 34, the effective stiffness of plug 64 may be changed during its operating life by varying the tension of spring 34. This allows one to compensate for age and wear of the plug and other components during the operating life of the facsimile system.

In addition to the shock forces generated during startup, irregularities in the driving motor or driving gear train may generate sudden shocks which would normally be coupled through to drum 12 were it not for the presence of the resilient plug 64. These shocks would then cause sudden changes in the speed of the drum which might distort reproduction of that portion of the document being read at the time of the shocks; they might also cause damage to the gear train and driving motor due to the reactive forces generated on these elements by the drum. However, since plug 64 is interposed between the driving motor 42 and driving gear 44 on the one hand, and the drum 12 on the other, any sudden forces generated by the motor or the driving gear are applied to plug 64 before transmittal to drum 12. As described previously, the inertia of drum 12 resists any sudden change in the rotational velocity and therefore the same "filtering" action will take place as occurred during startup, the plug 64 suddenly deforming to store energy and subsequently returning more gradually to a state of lesser distortion, thereby transmitting the excess energy to the drum at a slower rate in the form of a driving transient of reduced magnitude.

Due to the energy-absorbing capabilities of plug 64, drum 12 may be stopped quickly after the reproduction cycle simply by mechanically contacting or "grabbing" the drum and restraining its further rotation. This indexes the drum to a precise angular location after each reproduction so as to properly orient the drum for loading and unloading as described more fully in copending patent application Ser. No. 747,001, filed July 23, 1968 by Eric A. von Hippel and assigned to the assignee of the present invention. Grabbing the drum in this manner also stops the driving motor by stalling it. It also distorts the energy-absorbing element again and causes it to store energy, the stored energy being subsequently released to the motor more gradually as previously described.

Stopping the drum in this fashion can not normally be done with impunity unless the system employs some sort of decoupling between the drive system and the drum itself. In facsimile systems of the type presently known, the decoupling mechanism is generally a clutch interposed between the drum and the drive system. Such clutches are generally quite costly, especially when they are to be utilized in a small, lightweight, portable facsimile system and thus their elimination contributes to a more economical system.

It will be noted from FIGS. 3 and 4 that the blade portion 16 of coupling plate 14 fits into slot 18 of shaft 20 without any additional connectors or pins to hold it in place. In effect, it makes a "screwdriver" fit with shaft 20. Because of the flexibility of the plug 64, the blade 16 is readily inserted into slot 18 even when the shaft 20 is not precisely aligned with the blade. Thus, dimensional tolerances in manufacturing may now be less critical than is the case in prior comparable drive systems, yet the alignment of the separate parts for assembly is no more difficult. Further, the present drive system is readily disengaged from the drum when the facsimile system has to be disassembled for repair or other purposes and is quickly reassembled without the use of special tools or critical alignment procedures.

Turning again to FIG. 1, lead screw 24 is similarly easily separated from drive system 10 through its sliding connection with gear 30. It is not necessary that gear 30 have a resilient element such as is contained in gear 44, since the latter provides the necessary shock absorption for the entire system. Further, since plug 64 readily compensates for misalignment between drum 12 and blade 16, drive system 10 is quickly connected to drive the drum by first aligning lead screw 24 and gear 30 and then bringing blade 16 into alignment with slot 18 in shaft 20. Alternatively, a resilient, energy-absorbing element could also be provided within hub 32 for engaging hexagonal head 30.

The material from which plug 64 is formed may be any flexible, resilient, energy-absorbing material such as a rubber or an elastomer. The hardness of the material selected will depend in part on the driving characteristics of the motor; the frictional characteristics of the gear train, the drum support system, and the friction arm 34; and the size and inertia of drum 12, as well as the thickness of the plug and the material from which it is made.

In the preferred embodiment of the invention, plug 64 is formed from neoprene having a durometer rating of approximately seventy. The blade 14 is preferably molded into plug 64. The plug may be molded within central aperture 62 or it may be formed separately and fastened into place as shown in FIG. 4 by means of pin 66 extending through the plug and the hub in which it is mounted. If a softer, more flexible rubber or elastomer is used for plug 64 and if the plug is not subjected to a relatively large load, its peripheral contact area may be cemented to the wall of cavity 62.

From the above it will be seen that we have provided an improved drive system for a rotary drum facsimile apparatus. The drive system has a resilient, energy-absorbing element interposed between the drive motor and the drum which absorbs shocks or impulses caused by the sudden application of the driving force or by motor or gear irregularities. The energy-absorbing element obviates the use of an expensive clutch to connect the drive motor to the drum and allows one to quickly stop the drum by mechanically contacting it and restraining further motion when the drum reaches a predetermined rotational position.

Stopping the drum in this manner in the absence of some type of clutch to disconnect the drive motor and drive gear train from the drum would normally place a severe strain on the motor and gear train and would lead to their eventual malfunction. In the present system, however, the energy-abosrbing element damps shocks from whatever causes and effectively prevents the transmittal of these shocks to other elements in the system.

We have also provided an improved drive coupler for rapidly connecting and disconnecting the drum and the drive system. The driving element is in the form of a wedge-shaped or "screwdriver" blade embedded in the energy-absorbing element. In addition to providing for rapid connection and disconnection of the drum and drive system, it also provides for rapid alignment of the drum and the drive system since the blade can be moved about within the flexible, energy-absorbing element to correct for minor errors in alignment.

We have also shown how to utilize an adjustable tensioning element to provide a restraining force of predetermined magnitude to the drum to modify the amount of torsional distortion the energy-absorbing element initially undergoes when a driving force is applied through it to the drum. Any change in the magnitude of this initial distortion affects the effective stiffness of the element and thus alters its damping characteristics which are thus readily controlled merely by adjusting the drum tensioning element as desired.

It will thus be seen that the objects set forth above, among those made apparent from the preceding description, are efficiently attained, and, since certain changes may be made in the above system without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In a facsimile apparatus having a drum for rotation about a shaft and having a reading and reproducing head for motion parallel to said shaft adjacent said drum for reading and reproducing a document mounted on the drum, the improvement consisting of a shock energy-absorbing drive system for reducing shock-force coupling between the drum and a motive power source driving the drum, said drive system comprising:

(A) a rotatable driving element for connection to said motive power source;

(B) an energy-absorbing element connectable to said driving element for rotation therewith, said energy-absorbing element being resiliently deformable when a load is applied thereto to thereby absorb at least a portion of said load; and (C) a coupling element connected to said energy-absorbing element and connecting said element to the drum shaft to thereby rotate said shaft in synchronism with said driving element, the coupling element being restrainedly rotatable within the energy-absorbing element to thereby deform the energy-absorbing element to a limited extent whereby shock loads applied to said drum or to said driving element are smoothed on transmittal throtugh said energy absorbing element.

2. A drive system according to claim 1 in which said driving element includes at least a first driving gear having a hub on which the energy-absorbing element is mounted concentric therewith, said hub being axially aligned with the shaft of said drum and being connected thereto through said element whereby forces applied suddenly between said hub and said drum are at least partially absorbed by the torsional resistance of said energy-absorbing element.

3. A drive system according to claim 2 in which the energy-absorbing element is fitted into an aperture in the driving gear hub concentric with the axis thereof, and in which the coupling element has a portion thereof fixed within the energy-absorbing element for interchange of torsional forces therewith.

4. A drive system according to claim 3 in which the coupling element comprises a plate-like portion embedded within the energy-absorbing element and a blade portion connected to the plate-like portion and extending therefrom for connection to the shaft of the drum, the drum having a slotted end portion for receiving the blade in driving engagement therewith.

5. A drive system according to claim 1 in which said energy-absorbing element comprises a resilient slab of elastomeric material through which the driving force for said drum is transmitted.

6. A drive system according to claim 5 in which the energy-absorbing element is molded around a portion of the coupling element to thereby embed said portion therein and form a firm connection between the two said elements whereby driving and shock forces may be transmitted between the two.

7. A drive system according to claim 6 in which said head is mounted on a lead screw, said screw being connected to said drive system for receiving rotational motion therefrom and for imparting translational motion to said head.

8. A drive system according to claim 5 in which said energy-absorbing element is a relatively flexible element adhesively connected to said driving element over substantially its entire contact area therewith.

9. A drive system according to claim 5 in which said energy-absorbing element is a relatively stiff element which is mechanically fastened to said driving element.

10. A drive system according to claim 5 which includes means for applying a restraining force to said drum to restrain motion of said drum until the driving force transmitted through said energy-absorbing element exceeds said restraining force whereby the energy-absorbing characteristics of the energy-absorbing element may be modified in accordance with said restraining force.

11. A drive system according to claim 1 in which said reading and reproducing head is driven from said drive system in synchronism with said drum whereby said head is moved over said document in accordance with a fixed scanning pattern.

12. A shock energy-absorbing drive system for a rotary drum facsimile apparatus, said system comprising:

(A) a rotary driving element, (B) a block of resilient, energy-absorbing material for rotational engagement with said driving element, wherein said driving element includes at least one driving gear, said gear having a hub, an aperture formed in said hub for reception of said energy-absorbing block, and wherein said energy absorbing block is secured to said hub by a pin extending through said hub and said energy-absorbing block, and (C) coupling means connectable to said energy-absorbing block for transmitting rotational motion from said driving element to said drum through said energy-absorbing block whereby sudden forces generated by said driving means or said drum are damped on passage through said energy-absorbing block, by distorting said block said coupling means comprising:

(D) a member embedded in said energy-absorbing block forming means for applying a torsional force thereto for deforming said block.

13. A drive system as defined in claim 12 wherein said embedded member comprises an aperture, and wherein a portion of said block of resilient energy-absorbing element extends through said aperture.

References Cited

UNITED STATES PATENTS

| | | | |
|---|---|---|---|
| 2,098,802 | 11/1937 | Finch | 178—69.5 |
| 2,421,438 | 6/1947 | Shonnard | 178—69.5 |
| 2,725,188 | 11/1955 | Scott | 64—11 X |
| 2,827,229 | 3/1958 | Blum | 64—11 X |
| 2,873,599 | 2/1959 | Buechler | 64—11 X |
| 2,956,187 | 10/1960 | Wood | 64—11 X |
| 3,159,045 | 12/1964 | Lohr | 64—11 X |
| 3,235,953 | 2/1966 | Adams | 64—27 X |

JAMES A. WONG, Primary Examiner